(12) United States Patent
Borroni

(10) Patent No.: US 8,770,344 B2
(45) Date of Patent: Jul. 8, 2014

(54) ACOUSTIC PANEL

(75) Inventor: Mark Borroni, Surrey Hills (AU)

(73) Assignee: Bellmax Acoustic Pty Ltd., Surrey Hills (AU)

( * ) Notice: Subject to any disclaimer, the term of this patent is extended or adjusted under 35 U.S.C. 154(b) by 0 days.

(21) Appl. No.: 13/809,540

(22) PCT Filed: Jul. 12, 2011

(86) PCT No.: PCT/AU2011/000874
§ 371 (c)(1), (2), (4) Date: Feb. 12, 2013

(87) PCT Pub. No.: WO2012/006663
PCT Pub. Date: Jan. 19, 2012

(65) Prior Publication Data
US 2013/0133978 A1 May 30, 2013

(30) Foreign Application Priority Data

Jul. 13, 2010 (AU) .................................. 2010903101

(51) Int. Cl.
*E04B 1/84* (2006.01)
*E04B 1/82* (2006.01)
*E04B 1/74* (2006.01)

(52) U.S. Cl.
USPC ............................ 181/290; 181/291; 181/288

(58) Field of Classification Search
USPC ......... 181/290, 291, 285, 210, 288, 284, 207, 181/208; 52/144, 145
See application file for complete search history.

(56) References Cited

U.S. PATENT DOCUMENTS

| 2,159,488 | A | * | 5/1939 | Parkinson | 52/145 |
| 2,166,848 | A | * | 7/1939 | Prudden | 181/208 |
| 2,541,159 | A | * | 2/1951 | Geiger | 181/208 |
| 3,020,184 | A | * | 2/1962 | Cubberley et al. | 428/138 |
| 3,482,505 | A | * | 12/1969 | Dobbins et al. | 454/296 |
| 3,834,487 | A | * | 9/1974 | Hale | 181/292 |
| 3,851,724 | A | * | 12/1974 | Banks, Jr. | 181/208 |
| 3,983,956 | A | * | 10/1976 | Manhart | 181/210 |
| 4,248,647 | A | * | 2/1981 | Herron et al. | 156/84 |
| 4,425,981 | A | * | 1/1984 | Kiesewetter et al. | 181/286 |
| 4,450,195 | A | * | 5/1984 | Hagbjer | 428/178 |
| 4,469,736 | A | * | 9/1984 | Machholz | 428/159 |
| 4,553,631 | A | * | 11/1985 | Panza | 181/291 |

(Continued)

FOREIGN PATENT DOCUMENTS

| EP | 892386 A2 * | 1/1999 | G10K 11/172 |
| GB | 1579897 A | 11/1908 | |
| JP | 2001-262730 A | 9/2001 | |
| WO | 2009/023900 A1 | 2/2009 | |

*Primary Examiner* — Edgardo San Martin
(74) *Attorney, Agent, or Firm* — Westerman, Hattori, Daniels & Adrian, LLP

(57) ABSTRACT

A multilayered acoustic panel (1) including: a substantially air impermeable outer membrane layer (3); an underlying second portion bonded to the membrane layer (3), the second portion including an intermediate layer (5); and an inner layer (7) underlying the second portion, the inner layer (7) having a plurality of apertures (6) therein, said apertures (6) being covered by the intermediate layer (5) of the second portion, wherein the membrane layer (3) and second portion are not bonded together where the membrane layer (3) overlies the apertures (6) such that those portions of the membrane layer (3) which overlie the apertures (6) are free to vibrate independently of the second portion in response to sound waves incident on the membrane layer (3).

13 Claims, 9 Drawing Sheets

(56) References Cited

U.S. PATENT DOCUMENTS

| | | |
|---|---|---|
| 6,186,270 B1 * | 2/2001 | Roller et al. ............... 181/286 |
| 6,202,786 B1 * | 3/2001 | Pfaffelhuber et al. ....... 181/286 |
| 6,260,660 B1 * | 7/2001 | Yoerkie et al. ............. 181/290 |
| 6,720,069 B1 | 4/2004 | Murakami et al. |
| 6,878,432 B2 * | 4/2005 | Ueda et al. ................. 428/174 |
| 8,474,574 B1 * | 7/2013 | Kobayashi et al. .......... 181/292 |
| 2012/0240486 A1 | 9/2012 | Borroni |

* cited by examiner

ACOUSTIC PANEL

CROSS-REFERENCE TO RELATED APPLICATIONS

The present patent application is a nationalization of International application No. PCT/AU2011/000874, filed Jul. 12, 2011, published in English, which is based on, and claims priority from, Australian Application No. 2010903101, filed Jul. 13, 2010, both of which are incorporated herein by reference in their entireties.

FIELD OF THE INVENTION

The present invention relates to a multilayered acoustic panel which is acoustically absorbent relative to conventional air impermeable panels, such as plasterboard or drywall. The panel according to the present invention is particularly suited for lining an interior wall of a building in the same manner as conventional plasterboard panels. The acoustic panel is designed to remain noise absorbing after painting. It will therefore be convenient to describe the invention in relation to that example application. It should however be understood that the invention is equally suitable for lining other structures that are required to absorb noise, for example ceilings. Various forms of the panel are also suitable for automotive applications and external applications such as roadside absorptive acoustic barriers.

BACKGROUND TO THE INVENTION

The interior walls of buildings, for example houses, offices, restaurants, retail stores, hospitals and the like typically include a frame lined with plasterboard panels. The frame of the wall normally includes a series of upright beams, commonly referred to as studs, to which the plasterboard panels are mounted. The panels are mounted to the studs such that the ends of adjoining panels abut one another. The ends are then covered with wet plaster and subsequently sanded when the plaster dries to provide a continuous wall surface. The wall surface created by the plasterboard panels is also usually painted to provide an aesthetically pleasing appearance.

In general, hard, solid materials, for example plasterboard panels, reflect sound better than softer air permeable materials. In this respect, sound waves incident upon an interior wall lined with plasterboard tend to be reflected well. The reflected sound waves can also undergo reflection by bouncing off other walls and surfaces, even after the source ceases emitting sound. This phenomenon is known as reverberation and the time it takes for reverberant sound energy to dissipate by 60 dB is known as the reverberation time. The reverberation time in an enclosure, for example a room, can make a significant impact upon the intelligibility of speech. In this respect if the reverberation time is too long speech can be difficult to interpret as the reverberant sound in the room acts as background noise.

Ideally, the issue of reverberation is considered and addressed at the design stage of a building. However, in some instances, reverberation problems may not become apparent until construction of a building is completed. In both cases there are various options available to address reverberation issues. These typically include the use of perforated acoustic tiles, carpet, curtains, fabric wall linings and other soft materials. Unfortunately, many of these options are not able to adequately blend with the desired aesthetic appearance.

The acoustic panel disclosed in International Publication No. WO 2009/023900, (herein after referred to as "the Bellmax panel"), the contents of which are herein incorporated by reference, sought to address the issue of aesthetic appearance by providing a sound absorbing acoustic panel which mimicked the look and feel of a conventional plasterboard panel, could be painted like conventional plasterboard yet remained sound absorbing, and be installed using the same installation method as conventional plasterboard. The primary components of the Bellmax panel were a membrane layer made of paper or a polymer film, and an underlining perforated sound absorbing layer preferably made of fibrous polyester material.

Although the Bellmax panel mimicked the look and feel of a conventional plasterboard panel, could be painted like conventional plasterboard, and installed using the same installation method as conventional plasterboard, its ability to absorb sound wave energy once painted was found to be limited to very specific frequencies. In addition, flammability issues made it difficult for the Bellmax panel to adequately comply with stringent building regulations.

FIG. 1 of the accompanying drawings provides a graph showing the absorption coefficient across a range of frequencies for a painted sample Bellmax panel of the prior art. The sample Bellmax panel consisted of a membrane layer made of paper, and a sound absorbing layer made of fibrous polyester having a surface density of approximately 1800 $g/m^2$ (without apertures). The sound absorbing layer had a plurality of 15 mm apertures extending therethrough which provided the layer with 33% open area. The sample was mounted to a frame structure having wall type studs with sound absorbing material having a surface density of approximately 800 $g/m^2$ being located behind the sample in a wall cavity having a depth of 25 mm.

The graph in FIG. 1 demonstrates that the sample Bellmax panel has two prominent absorption peaks at approximately 300 Hz and 1700 Hz with virtually no absorption being provided at other frequencies. The absorption peak at 300 Hz is due to the sample Bellmax panel, in combination with the enclosed air volume in the wall cavity behind the sample, acting as a panel absorber. In this respect, a panel absorber is a form of resonant oscillating mass-spring system whereby the panel is able to resonate in response to sound waves incident on the panel with dampening being provided by the enclosed air volume. The absorption peak at 1700 Hz is due to the portions of the membrane layer which overlie the 15 mm apertures acting as diaphragms which vibrate at maximum amplitude when imparted with sound waves of a frequency corresponding to their resonant frequency, thereby reducing the sound waves energy.

In view of the above, it would be desirable to provide an acoustic panel which is able to absorb sound wave energy across a broad range of frequencies, whilst at the same time mimic the look and feel of a conventional plasterboard panel when painted and be sufficiently nonflammable to comply with building regulations.

Any discussion of documents, devices, acts or knowledge in this specification is included to explain the context of the invention. It should not be taken as an admission that any of the material formed part of the prior art base or the common general knowledge in the relevant art in Australia or any other country on or before the priority date of the claims herein.

SUMMARY OF THE INVENTION

In accordance with the present invention there is provided a multilayered acoustic panel including:
  a substantially air impermeable outer membrane layer;

an underlying second portion bonded to the membrane layer, the second portion including an intermediate layer; and an inner layer underlying the second portion, the inner layer having a plurality of apertures therein, said apertures being covered by the intermediate layer of the second portion, wherein the membrane layer and second portion are not bonded together where the membrane layer overlies the apertures such that those portions of the membrane layer which overlie the apertures are free to vibrate independently of the second portion in response to sound waves incident on the membrane layer.

Each portion of the membrane layer which overlies an aperture defines a diaphragm which can vibrate in response to sound waves incident on the membrane layer. In this respect, an air gap is preferably defined between the membrane layer and the second portion where each portion of the membrane layer overlies an aperture. More particularly, an air gap may be defined between the membrane layer and the intermediate layer where each portion of the membrane layer overlies an aperture. To increase the depth of the air gaps, the intermediate layer can be slightly depressed into the apertures. Preferably, the air gaps have a maximum depth of approximately 1 to 4 mm.

In one embodiment, the intermediate layer of the second portion is preferably bonded to the membrane layer but is not bonded to those portions of the membrane layer which define the diaphragms. The second portion may further include an adhesive sheet layer positioned between the intermediate layer and the inner layer. The adhesive layer may also be perforated. Further, the inner layer preferably includes a front face and rear face with the apertures being provided in said front face. The apertures in the front face may also extend through the inner layer to the rear face to thereby define a series of passageways. In another embodiment, the intermediate layer is directly bonded to the front face of the inner layer.

In accordance with one embodiment of the present invention, the panel is particularly suited for lining an interior wall of a building in the same manner as a conventional plasterboard panel. In this regard, the intermediate layer may be made of a porous material, for example a fibrous material or a foam material and has a surface density of less than approximately 400 g/m². The fibrous material may for example include or be made entirely of ceramic fibres. The membrane layer may also be made of a bonded fibrous material such as paper. Alternatively the membrane layer may be made of a polymer film. The inner layer is preferably a sound absorbing layer made of a fibrous material or a foam material.

In accordance with another embodiment of the present invention, which is particularly suited for automotive applications where the panel could be subject to heat from the engine or exhaust system, the intermediate layer is made of a non-porous material, for example a metallic foil and has a surface density of less than 200 g/m². For automotive applications, the membrane layer may also be made of a metallic foil and the inner layer can be made of a metallic sheet material. The intermediate layer and the membrane layer may also be embossed with a plurality of indentations.

In accordance with another embodiment of the present invention, which is particularly suited for external applications such as roadside absorptive acoustic barriers, the membrane layer is made of a UV resistant material such as a fluoropolymer film.

BRIEF DESCRIPTION OF THE DRAWINGS

Further benefits and advantages of the present invention will become apparent from the following description of preferred embodiments of the invention. The description should not be considered as limiting any of the statements in the previous section. The preferred embodiments will be described with reference to the following figures in which.

DESCRIPTION OF PREFERRED EMBODIMENTS

Figure 2:
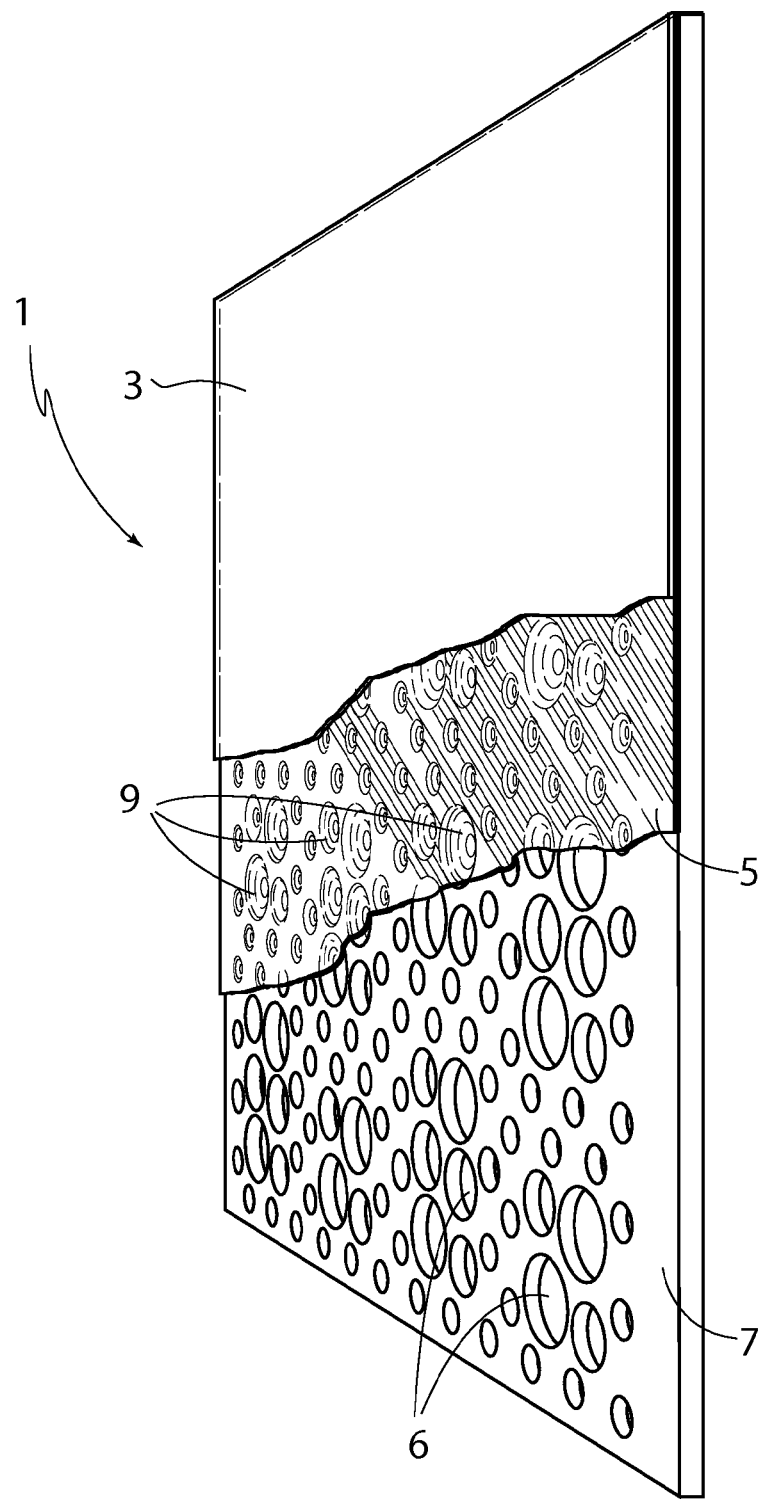
FIG. 2 is a perspective view of a section of a panel in accordance with an embodiment of the invention, showing the membrane layer partially removed from the panel and the intermediate layer covering the sound absorbing inner layer with a small section of the intermediate layer removed to expose a section of the underlying sound absorbing inner layer.

With reference to the FIG. 2 of the accompanying drawings there is shown a multilayered acoustic panel 1 in accordance with an embodiment of the invention. The panel 1 includes a substantially air impermeable outer membrane layer 3 and an underlying second portion bonded to the membrane layer 3. The second portion of the panel 1 includes an intermediate layer 5. The membrane layer 3 is regarded as the outermost or top layer of the panel 1 because, in use, the panel 1 is orientated such that the membrane layer 3 is closest to the noise source. The panel 1 further includes an inner layer 7 underlying the second portion. The inner layer 7 has a plurality of apertures 6 therein. The apertures 6 are covered by the intermediate layer 5 of the second portion.

A section of the intermediate layer 5 has been removed from the panel 1 in FIG. 2 such that the apertures 6 can be more clearly seen. Similarly, a section of the membrane layer 3 has been removed from the panel 1 in FIG. 2 such that the intermediate layer 5 can be more clearly seen. In FIG. 2, the intermediate layer 5 of the second portion is bonded directly to the membrane layer 3 and is similarly directly bonded to the inner layer 7. The membrane layer 3 is however not bonded to the intermediate layer 5 where the membrane layer 3 overlies the apertures 6 such that those portions of the membrane layer 3 which overlie the apertures 6 are free to vibrate independently of the intermediate layer 5 in response to sound waves incident on the membrane layer 3. These portions of the membrane layer 3 each define a diaphragm.

The diaphragms vibrate in response to sound waves incident on the membrane layer 3 and thereby absorb at least part of the sound waves energy.

In this respect, each diaphragm has a resonant frequency at which the diaphragm will vibrate at maximum amplitude when imparted with sound waves of a frequency which corresponds to the diaphragm's resonant frequency, thereby reducing sound wave energy.

In the various embodiments of the panel 1 illustrated in the accompanying figures, the membrane layer 3 is substantially impermeable to airflow and may be made of a polymer film, for example polyester, polyethylene, polypropylene, BOPP, fluoropolymer, PVC, EVA. Alternatively, the membrane layer 3 can be made of a metal foil or paper, preferably a type of paper commonly known as clay coated paper. Other types of paper may also be used, for example wall paper, high wet strength kraft paper. The membrane layer 3 may also be multilayered and consist of a combination of the above materials. Unpainted, the membrane layer 3 preferably has a thickness which is no greater than approximately 0.05 mm and a surface density which is preferably less than 100 $g/m^2$. When painted with two coats of paint, the membrane layer 3 preferably has a surface density of less than 200 $g/m^2$, more preferably between approximately 100 and 170 $g/m^2$. Accordingly, if the membrane layer 3 is painted, the dried paint provides approximately 60-70 percent of the diaphragm's surface density. During application of paint, the paint tends to shrink and flatten as the paint dries which provides tension to the diaphragms.

The intermediate layer 5 of the second portion is positioned between the membrane layer 3 and the inner layer 7 and covers a front face of the inner layer 7 such that all apertures 6 are preferably covered by the intermediate layer 5. The intermediate layer 5 provides a degree of protection, for example from fire, heat or fluids, to the inner layer 7 and any components positioned behind the panel 1. In the embodiment of the panel 1 shown in FIG. 2, the second portion includes only the intermediate layer 5. In other embodiments, the second portion may include one or more additional layers either side of the intermediate layer 5.

For applications of the panel 1 as a lining of an interior wall of a room in a building, the intermediate layer 5 is preferably porous and made of a fibrous material or a foam material and preferably has surface density of less than 400 $g/m^2$. For example, the intermediate layer 5 could be made of a fibrous polymer sheet, an open cell foam or foam rubber sheet. Other materials such as fibrous ceramic paper, non woven glass/mineral fibre and polymers could also be used. The intermediate layer 5 provides a degree of protection to the underlying inner layer 7 and is preferably resistant to combustion and can withstand extreme temperature without being substantially damaged. In addition the intermediate layer 5 improves the acoustic performance of the panel 1 by preventing reflected sound from behind the panel 1 being reflected back into the room. Further, by providing an intermediate layer 5 of fibrous material, the edges of the apertures 6 are masked and softened by the intermediate layer 5 which results in a much smoother surface finish once the membrane layer 3 of the panel 1 is painted.

If the intermediate layer 5 is made of a paper having ceramic fibres, the ceramic paper preferably has a thickness of approximately 12 mm and a surface density of up to approximately 400 $g/m^2$. Ceramic paper can advantageously act as a fire barrier due to its resistance to combustion and ability to withstand high temperatures.

The inner layer 7 provides the bulk of the panel 1 and preferably has a surface density between approximately 1000 $g/m^2$ and 3000 $g/m^2$ (without apertures 6). The apertures 6 in the inner layer 7 may range between approximately 10 mm in diameter and 80 mm in diameter. The apertures 6 are provided in a front face of the inner layer 7 and preferably extend right though the inner layer 7 to the rear face. The number and size of the apertures 6 are preferably selected to provide each face of the inner layer 7 with an open area between approximately 20 and 55 percent. The apertures 6 may also be arranged in clusters to further enhance the panels 1 sound absorption capabilities. A panel having apertures arranged in clusters is disclosed in Australian Provisional Patent Application No. 2009905120, the contents of which are herein incorporated by reference.

The apertures 6 may be punched or cut or could be formed when the panel 1 is manufactured. Depending upon the materials used and manufacturing method, it may be possible to form the intermediate layer 5 in conjunction with the inner layer 7. Alternatively, the intermediate layer 5 could be laid into a mould of the inner layer 7 and joined during a forming process. In order to bond the intermediate layer 5 to the inner layer 7 a powdered low density polyethylene (LDPE) may be laid onto the inner layer 7 with heat then applied to melt the LDPE powder and bond the inner layer 7 to the intermediate layer 5. This is preferably achieved by using a belt laminator at a temperature above 150° C. Instead of using powdered LDPE, an adhesive sheet material layer 10 could be used, for example a LDPE film.

The inner layer 7 may be made of compressed fibrous materials such as bonded polyester, polyester blend, rockwool, fibreglass, or other fibrous polymers. Other materials such as open or closed cell foams, geopolymer foams, fibre reinforced foams, phenolic foams, polyurethane foams or cardboard could also be used. If a foam or foam fibre blend is used, a complex shape could be moulded such that the panel 1 could be used in automotive applications, for example in underbody or engine bay applications where a complex 3-dimensional shape is required.

The embodiments of the panel 1 shown in FIGS. 2, 3, 8, 9 and 10, are particularly suited for applications of the panel 1 as a lining of an interior wall of a building. The inner layer 7 is preferably in the form of a sound absorbing layer which is made of compressible fibrous material, for example a nonwoven polyester material. The thickness of the inner layer 7 is this particular application is approximately 9 to 11.5 mm, preferably 11 mm such that the overall thickness of the panel 1 approximately matches 13 mm thick conventional plasterboard.

The membrane layer 3 can be bonded to the intermediate layer 5 using a suitable bonding agent. In this respect the membrane layer 3, for example the polymer film, may be dual layered in that it can have an underlying layer, for example a LDPE layer, that can be melted using a belt laminator to bond the membrane layer 3 to the intermediate layer 5. As the membrane layer 3 is not bonded to the intermediate layer 5 where the membrane layer 3 overlies the apertures 6, small air pockets or gaps 17 are effectively provided between the intermediate layer 5 and the membrane layer 3.

Figure 3:
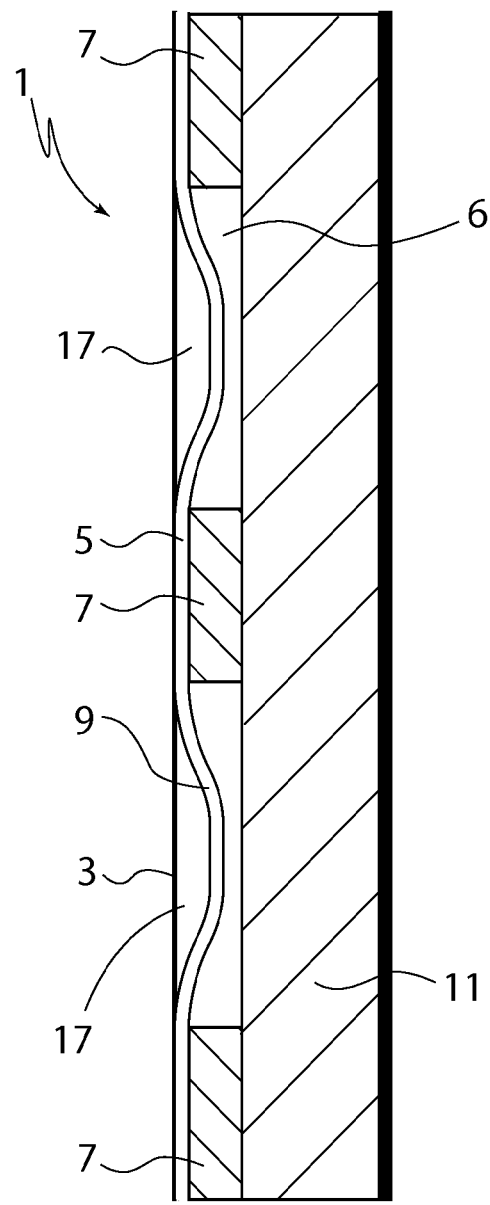
FIG. 3 is a cross-sectional view of a wall-type structure incorporating the panel shown in FIG. 2 with the intermediate layer of the panel being slightly depressed in the apertures in the sound absorbing inner layer to provide an air gap, in accordance with an embodiment of the invention.

FIG. 3 is a cross-sectional view of a wall-type structure incorporating the panel 1 shown in FIG. 2. A wall-type structure, for example the interior wall of a building, typically includes a frame lined with plasterboard panels. The frame of the wall normally includes a series of upright beams, commonly referred to as studs, to which plasterboard panels are mounted. Between the studs a series of wall cavities are created behind the panel. In FIG. 3, the panel 1 is shown with insulating material 11 in the wall cavity behind the panel 1.

In order to increase the depth of the air gap 17 between the intermediate layer 5 and the membrane layer 3, the intermediate layer 5 can be slightly pressed into the apertures 6 in the inner layer 7 during manufacture, or be preformed as such, so that a series of hollows or depressions 9 are provided preferably having a depth of approximately 1 to 4 mm.

As the depressions 9 lie slightly below the remaining portion of the intermediate layer 5, a bonding agent may be applied to the intermediate layer 5, for example by using a roller, without the depressions 9 being imparted with bonding agent. Accordingly, the membrane layer 3 can then be bonded on top of the intermediate layer 5 without bonding to the depressions 9.

Figure 8:
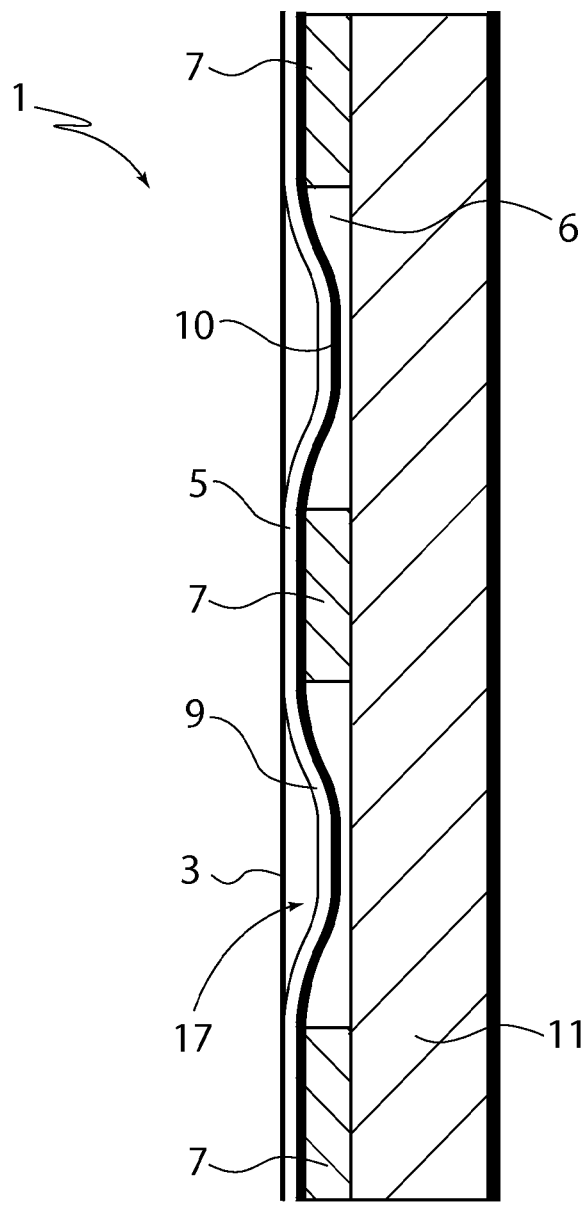
FIG. 8 is a cross-sectional view of a wall-type structure incorporating a panel having an adhesive layer between the intermediate layer and the sound absorbing inner layer, said layers being slightly depressed in the apertures in the sound absorbing inner layer to provide an air gap, in accordance with an embodiment of the invention.
Figure 9:
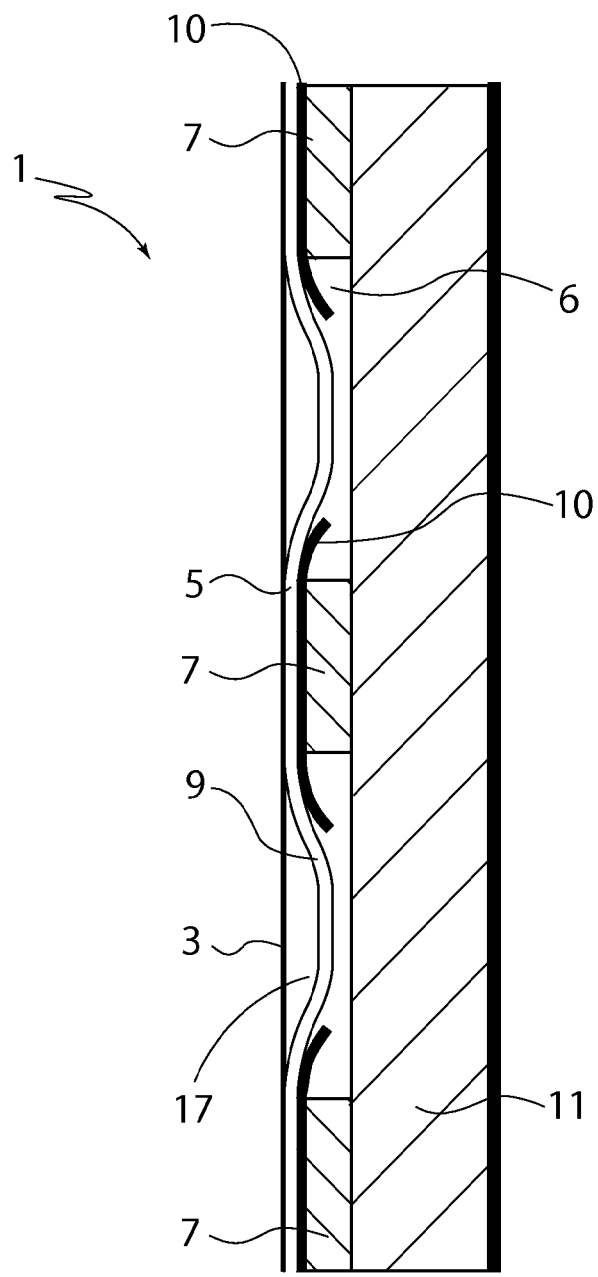
FIG. 9 is a cross-sectional view of a wall-type structure incorporating a panel having an adhesive layer between the intermediate layer and the sound absorbing inner layer, the adhesive layer having punched holes, in accordance with an embodiment of the invention.
Figure 10:
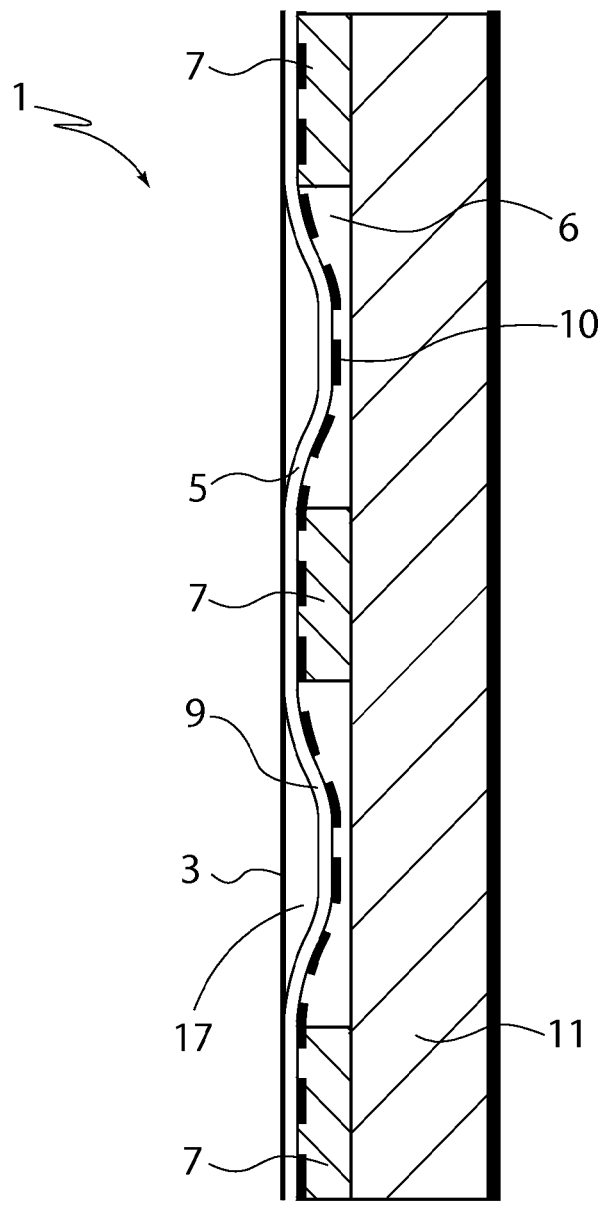
FIG. 10 is a cross-sectional view of a wall-type structure incorporating a panel having an adhesive layer between the intermediate layer and the sound absorbing inner layer, the adhesive layer being perforated, in accordance with an embodiment of the invention.

Rather than the membrane layer 3 being directly bonded to the intermediate layer 5, the second portion of the panel 1 may include additional layers (not shown in the drawings) between the membrane layer 3 and the intermediate layer 5, for example a metallic foil layer, to which the membrane layer 3 may be directly bonded. Similarly, rather than the inner layer 7 being directly bonded to the intermediate layer 5 as shown in FIGS. 2 and 3, the second portion of the panel 1 may include additional layers to which the inner layer 7 may be directly bonded, as shown in FIGS. 8, 9 and 10. The intermediate layer 5 may therefore be sandwiched between additional layers of the second portion.

FIG. 8 is a cross-section view of a wall-type structure incorporating a panel 1 similar to that shown in FIG. 2. However, second portion of the panel 1 in FIG. 8 includes an adhesive layer 10, for example a LDPE film or a phenolic impregnated paper, between the intermediate layer 5 and the inner layer 7. The adhesive layer 10 has a thickness of approximately 0.05 mm to 0.15 mm and a surface density of approximately 50 to 150 g/m². The adhesive layer 10 may be heated to bond the layer to the intermediate layer 5 and the inner layer 7. The adhesive layer 10 may also advantageously assist to protect the underlying inner layer 7 from fire, heat and fluids. As shown in FIG. 9, to improve the acoustic performance of the panel 1, the adhesive layer 10 may have holes punched in the layer 10 where the layer 10 overlies the apertures 6 in the inner layer 7. Similarly, as shown in FIG. 10, the adhesive layer 10 may instead be perforated to improve the acoustic performance of the panel 1.

For applications of the panel 1 as a wall lining, the panel 1 preferably has a length of approximately 2400 mm, a width of approximately 1200 mm, and a bevelled edge to match the edge portion of a conventional plasterboard panel. The overall thickness of the panel 1 is preferably the same as conventional plasterboard. However, the thickness of the panel 1 in the vicinity of the edge may be reduced by compression of the inner layer 7. As a result the thickness of the panel 1 may taper towards the edge portion with the edge resembling that of a conventional plasterboard panel. Accordingly, by using conventional wet plaster jointing techniques an infill of plaster can be provided over the edge portion such that the panel 1 can be seamlessly incorporated into a wall structure with the membrane layer 3 providing a continuous wall surface with the infill of plaster and an outer face of plasterboard panel. Once painted, the continuous wall surface has the same appearance of a wall structure made solely of plasterboard panels.

Figure 1:
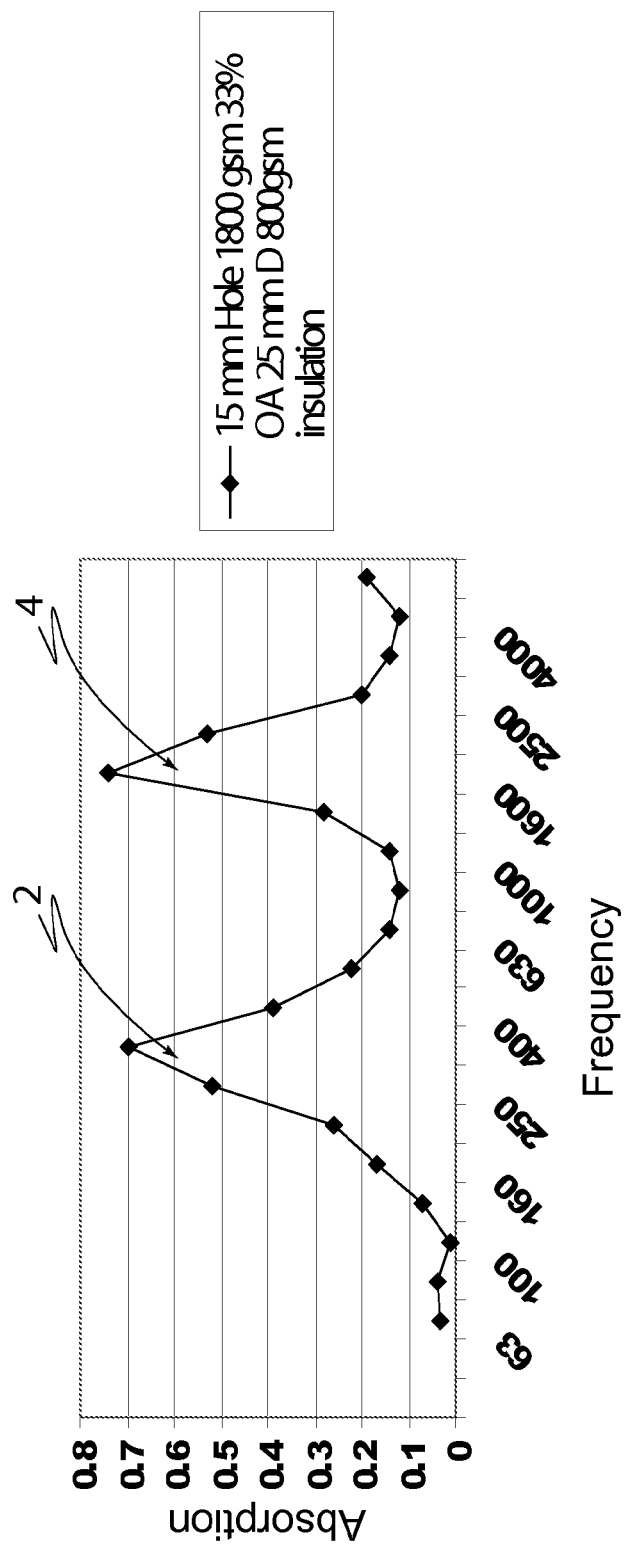
FIG. 1 is a graph showing the absorption coefficient of a sample prior art Bellmax panel at a range of frequencies.
Figure 4:
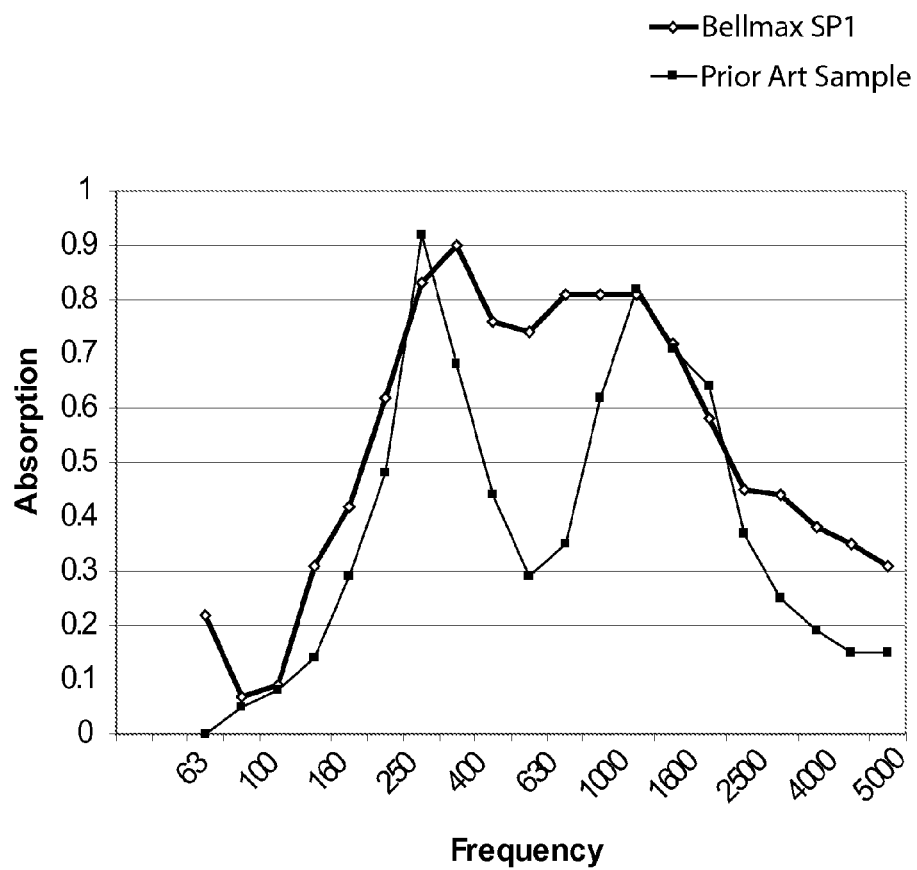
FIG. 4 is a graph showing a comparison of the absorption coefficient of two panels at a range of frequencies with one of the panels having an intermediate layer made of ceramic paper in accordance with an embodiment of the invention, the other panel being in accordance with the prior art.

The graph in FIG. 4 shows a comparison of the absorption coefficient of two panels at a range of frequencies. The sample identified in the graph as Bellmax SP1 is a panel in accordance with an embodiment of the invention, and the sample identified as Prior Art Sample is a prior art panel that is similar to the prior art Bellmax panel referred to in FIG. 1. The samples identified in FIG. 4 both have a membrane layer 3 in the form of a polymer film and an inner layer 7 of polyester material having a surface density of 1800 g/m² (without apertures). The inner layer 7 of both samples further include a plurality of apertures 6 having diameters of 15, 20 and 25 mm which provide the faces of the inner layer 7 with an open area of approximately 42%. The membrane layer 3 of both sample panels was also painted with two coats of paint. The Bellmax SP1 panel is similar to that shown in FIGS. 2 and 3 and includes an intermediate layer 5 which is made of ceramic paper. The polymer film is bonded to the ceramic paper with no bonding being provided where the polymer film overlies the apertures 6 in the inner layer 7. The graph in FIG. 4 shows that the Bellmax SP1 panel having the intermediate layer 5 provides significantly better sound absorption at frequencies between 250 Hz and approximately 1000 Hz than the Prior Art Sample which does not have an intermediate layer. Although the intermediate layer 5 covers the apertures 6, those portions of the membrane layer 3 which overlie the apertures 6 remain free to vibrate independently of the intermediate layer 5 in response to sound waves incident on the membrane layer 3 and thereby absorb at least part of the sound waves energy. The net result of having an intermediate layer 5 is significantly better and substantially uniform sound absorption at frequencies between 250 Hz and approximately 1000 Hz.

Figure 5:
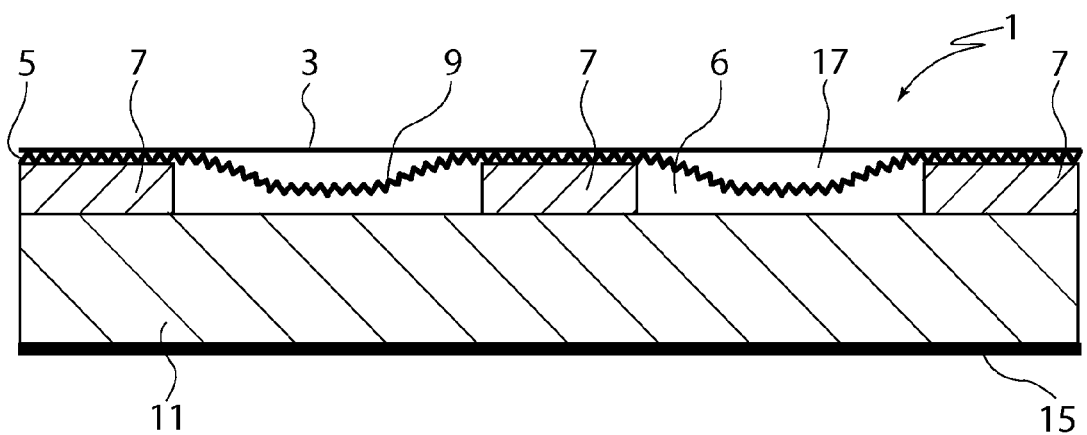
FIG. 5 is a cross-sectional view of a panel in accordance with an embodiment of the invention applied to a body portion of a motor vehicle with a layer of insulation positioned between the body portion and the inner layer of the panel, the panel having an embossed intermediate layer.
Figure 6:
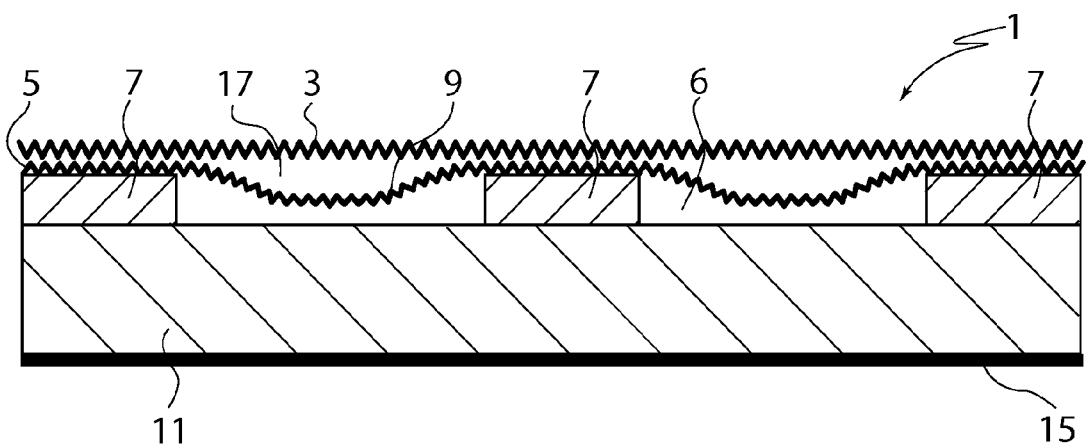
FIG. 6 is a cross-sectional view of a panel in accordance with an embodiment of the invention having an embossed membrane layer and embossed intermediate layer, applied to a body portion of a motor vehicle with a layer of insulation positioned between the panel and the body portion.
Figure 7:
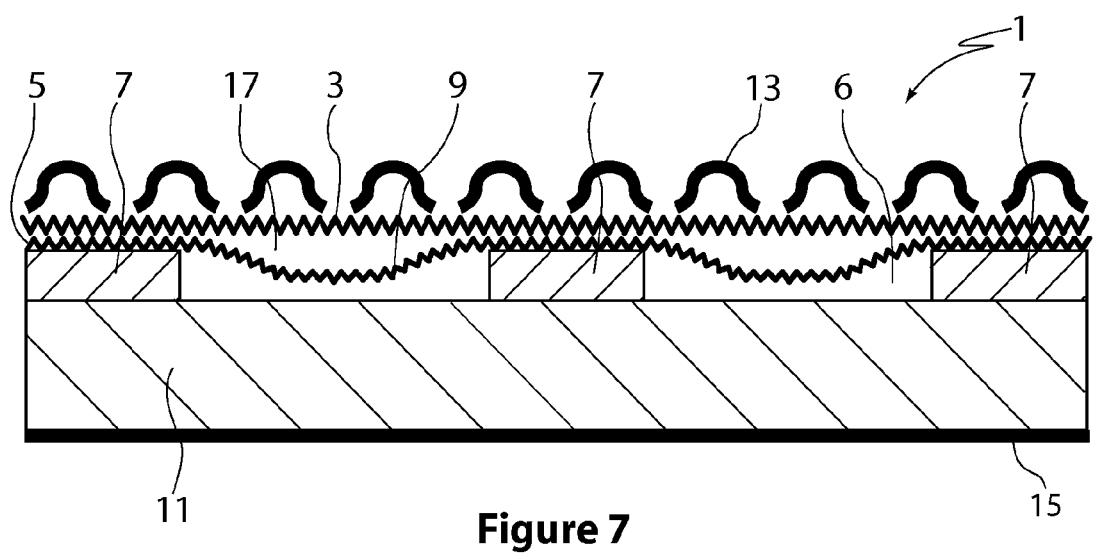
FIG. 7 is a cross-sectional view of the panel applied to a body portion of a motor vehicle, as shown in FIG. 6, with a perforated metallic outer support layer positioned on top of the panel.

In FIGS. 5, 6 and 7 of the accompanying drawings there is shown cross sectional views of various other embodiments of the multilayered acoustic panel 1 which are particularly suited for automotive applications. Like reference numerals are used throughout the Figures to refer to equivalent features. In these particular embodiments, the panel 1 is shown is applied to a body portion 15 of a motor vehicle with a layer of insulation 11 positioned between the body portion 15 and the inner layer 7 of the panel 1.

For automotive applications, the membrane layer 3 may be formed from a metallic foil. An underlying second portion of the panel 1 includes an intermediate layer 5 which may also be formed from a nonporous material such as aluminium. The second portion may further include additional metallic and/or fibrous layers between the membrane layer 3 and the intermediate layer 5. As the intermediate layer 5 in these embodiments is nonporous, the intermediate layer 5 preferably has a surface density of less than approximately 200 g/m² and a thickness of up to 2.5 mm. The inner layer 7 in these embodiments may also be constructed of a sheet of metal such as aluminium having a surface density between approximately 1000 g/m² and 3000 g/m². In the embodiment shown in FIG. 7, the panel 1 is positioned between a fibrous polyester or foam insulation layer 11 and a perforated outer metallic layer 13. The insulation layer 11 is compressed against the body portion 15, for example a firewall in an engine bay of the motor vehicle or underneath the vehicle floorpan on the underside of the transmission tunnel. The outer metallic layer 13 is provided on top of the panel 1 to provide protection to the underlying panel 1 from excessive heat, road debris and water.

As shown in FIGS. 5, 6 and 7, the intermediate layer 5 in these embodiments may be embossed to provide the layer with a series of indentations. Similarly, as shown in the embodiments of the panel 1 depicted in FIGS. 6 and 7, the metallic foil of the membrane layer 3 may be embossed to provide a similar series of indentations. The indentations assist to prevent heat being transferred through to the underlying insulation layer 11.

The panel 1 in accordance with the present invention is advantageously able to provide excellent sound absorption over a broad range of frequencies. In addition, the intermediate layer 5 of the panel provides a layer of protection over the apertures 6 and in building applications reduces sound wave energy reflected back into the room.

As the present invention may be embodied in several forms without departing from the essential characteristics of the invention it should be understood that the above-described embodiments should not be considered to limit the present invention but rather should be construed broadly. Various modifications and equivalent arrangements are intended to be included within the spirit and scope of the invention.

The invention claimed is:

1. A multilayered acoustic panel including:
   a substantially air impermeable outer membrane layer;
   an underlying second portion bonded to the membrane layer, the second portion including an intermediate layer; and
   an inner layer underlying the second portion, the inner layer having a plurality of apertures therein, said apertures being covered by the intermediate layer of the second portion,
   wherein the membrane layer and second portion are not bonded together where the membrane layer overlies the apertures such that those portions of the membrane layer which overlie the apertures are free to vibrate independently of the second portion in response to sound waves incident on the membrane layer.

2. A multilayered acoustic panel as claimed in claim 1 wherein each portion of the membrane layer which overlies an aperture defines a diaphragm which is able to vibrate in response to sound waves incident on the membrane layer.

3. A multilayered acoustic panel as claimed in claim 2 wherein an air gap is defined between the membrane layer and the second portion where each portion of the membrane layer overlies an aperture.

4. A multilayered acoustic panel as claimed in claim 3 wherein an air gap is defined between the membrane layer and the intermediate layer where each portion of the membrane layer overlies an aperture.

5. A multilayered acoustic panel as claimed in claim 4 wherein the intermediate layer is slightly depressed into the apertures to thereby provide said air gaps.

6. A multilayered acoustic panel as claimed in claim 5 wherein the air gaps have a maximum depth of approximately 1 to 4 mm.

7. A multilayered acoustic panel as claimed in claim 2 wherein the intermediate layer of the second portion is bonded to the membrane layer but is not bonded to those portions of the membrane layer which define the diaphragms.

8. A multilayered acoustic panel as claimed in claim 7 wherein the second portion further includes an adhesive layer positioned between the intermediate layer and the inner layer.

9. An acoustic panel as claimed in claim 1 wherein the intermediate layer is made of a fibrous material or a foam material.

10. An acoustic panel as claimed in claim 1 wherein the inner layer is a sound absorbing layer made of a fibrous material or a foam material.

11. An acoustic panel as claimed in claim 1 wherein the intermediate layer is made of a non porous material.

12. An acoustic panel as claimed in claim 1 wherein the membrane layer is made of a polymer film.

13. An acoustic panel as claimed in claim 1 wherein the membrane layer has a surface density of less than approximately 100 g/m$^2$.

* * * * *